US010875813B2

(12) United States Patent
Garcia et al.

(10) Patent No.: US 10,875,813 B2
(45) Date of Patent: Dec. 29, 2020

(54) PRECERAMIC RESIN FORMULATIONS, IMPREGNATED FIBERS COMPRISING THE PRECERAMIC RESIN FORMULATIONS, AND RELATED METHODS

(71) Applicant: Northrop Grumman Innovation Systems, Inc., Plymouth, MN (US)

(72) Inventors: Benjamin W. C. Garcia, Tremonton, UT (US); David R. Nelson, Logan, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 294 days.

(21) Appl. No.: 15/819,658

(22) Filed: Nov. 21, 2017

(65) Prior Publication Data

US 2019/0016640 A1    Jan. 17, 2019

Related U.S. Application Data (63) Continuation-in-part of application No. 15/651,970, filed on Jul. 17, 2017, now Pat. No. 10,731,036.

(51) Int. Cl.
*C04B 35/571*     (2006.01)
*B64C 1/00*       (2006.01)
(Continued)

(52) U.S. Cl.
CPC .............. *C04B 35/571* (2013.01); *B64C 1/00* (2013.01); *B64C 1/066* (2013.01); *B64C 1/12* (2013.01);
(Continued)

(58) Field of Classification Search
CPC .......... C08L 83/16; C08L 83/04; C04B 35/14; C04B 35/806; C04B 35/571;
(Continued)

(56) References Cited

U.S. PATENT DOCUMENTS 4,248,814 A    2/1981  Yajima et al.
4,414,403 A   11/1983  Schilling, Jr. et al.
(Continued)

FOREIGN PATENT DOCUMENTS

DE   102011055285 B3   2/2013
EP       0718254 A2   6/1996
(Continued)

OTHER PUBLICATIONS

Database WPI Week 199220 Thomson Scientific, London, GB; AN 1992-162725 XP002797265.
(Continued)

*Primary Examiner* — Noah S Wiese
(74) *Attorney, Agent, or Firm* — TraskBritt (57) ABSTRACT

A preceramic resin formulation comprising a polycarbosilane preceramic polymer, an organically modified silicon dioxide preceramic polymer, and, optionally, at least one filler. The preceramic resin formulation is formulated to exhibit a viscosity of from about 1,000 cP at about 25° C. to about 5,000 cP at a temperature of about 25° C. The at least one filler comprises first particles having an average mean diameter of less than about 1.0 µm and second particles having an average mean diameter of from about 1.5 µm to about 5 µm. Impregnated fibers comprising the preceramic resin formulation are also disclosed, as is a composite material comprising a reaction product of the polycarbosilane preceramic polymer, organically modified silicon dioxide preceramic polymer, and the at least one filler. Methods of forming a ceramic matrix composite are also disclosed.

42 Claims, 6 Drawing Sheets

(51) Int. Cl.

| | | |
|---|---|---|
| *C04B 35/80* | (2006.01) | |
| *B64C 3/26* | (2006.01) | |
| *B64C 1/12* | (2006.01) | |
| *C04B 35/82* | (2006.01) | |
| *B64C 1/06* | (2006.01) | |
| *B64C 11/20* | (2006.01) | |
| *C04B 35/628* | (2006.01) | |
| *F02K 9/08* | (2006.01) | |
| *F01D 5/28* | (2006.01) | |
| *F02K 9/34* | (2006.01) | |
| *B64G 1/58* | (2006.01) | |
| *F02K 9/97* | (2006.01) | |
| *F01D 25/00* | (2006.01) | |
| *B64C 27/473* | (2006.01) | |

(52) U.S. Cl.
CPC ............... *B64C 3/26* (2013.01); *B64C 11/20* (2013.01); *C04B 35/62863* (2013.01); *C04B 35/62868* (2013.01); *C04B 35/80* (2013.01); *C04B 35/806* (2013.01); *C04B 35/82* (2013.01); *F01D 5/282* (2013.01); *F02K 9/08* (2013.01); *F02K 9/346* (2013.01); *B64C 2001/0072* (2013.01); *B64C 2027/4733* (2013.01); *B64G 1/58* (2013.01); *C04B 2235/3206* (2013.01); *C04B 2235/3217* (2013.01); *C04B 2235/3244* (2013.01); *C04B 2235/3248* (2013.01); *C04B 2235/3418* (2013.01); *C04B 2235/3804* (2013.01); *C04B 2235/386* (2013.01); *C04B 2235/3813* (2013.01); *C04B 2235/3826* (2013.01); *C04B 2235/3839* (2013.01); *C04B 2235/3843* (2013.01); *C04B 2235/3847* (2013.01); *C04B 2235/3865* (2013.01); *C04B 2235/3873* (2013.01); *C04B 2235/483* (2013.01); *C04B 2235/5212* (2013.01); *C04B 2235/5248* (2013.01); *C04B 2235/5436* (2013.01); *C04B 2235/5445* (2013.01); *C04B 2235/5472* (2013.01); *F01D 25/005* (2013.01); *F02K 9/974* (2013.01); *F05D 2230/20* (2013.01); *F05D 2300/6033* (2013.01)

(58) Field of Classification Search
CPC ........ C04B 2235/80; C04B 2235/6567; C04B 2235/483; C04B 2235/3418; C04B 2235/3826; F02C 7/00; F02K 9/00; F02K 1/822; F01D 5/284; F05D 2300/222; F05D 2300/226; F05D 2300/22; F05D 2300/90; F05D 2300/2261; F05D 2230/30; F05D 2230/20
See application file for complete search history.

(56) References Cited

U.S. PATENT DOCUMENTS

| | | | |
|---|---|---|---|
| 4,719,273 A | 1/1988 | Seyferth et al. | |
| 4,737,552 A * | 4/1988 | Baney | C04B 35/571 501/88 |
| 5,082,872 A | 1/1992 | Burns et al. | |
| 5,334,414 A | 8/1994 | Edie et al. | |
| 5,356,499 A | 10/1994 | Decker et al. | |
| 5,780,126 A | 7/1998 | Smith et al. | |
| 5,872,070 A | 2/1999 | Dismukes et al. | |
| 6,013,711 A | 1/2000 | Lewis et al. | |
| 6,365,698 B1 | 4/2002 | Goldslager et al. | |
| 7,628,878 B2 | 12/2009 | Riedell et al. | |
| 8,466,076 B2 | 6/2013 | Ruedinger et al. | |
| 8,492,476 B2 | 7/2013 | Monden | |
| 8,604,149 B2 | 12/2013 | Clade et al. | |
| 8,658,755 B2 * | 2/2014 | Saito | C08G 77/12 525/477 |
| 8,919,254 B2 | 12/2014 | Diehl et al. | |
| 9,102,571 B2 | 8/2015 | Szweda et al. | |
| 9,412,970 B2 | 8/2016 | Han et al. | |
| 2006/0177686 A1 | 8/2006 | Henager et al. | |
| 2009/0252971 A1 | 10/2009 | Saha et al. | |
| 2009/0324930 A1 | 12/2009 | Tulyani et al. | |
| 2010/0015396 A1 | 1/2010 | Johnson et al. | |
| 2010/0255289 A1 | 10/2010 | Lewinsohn et al. | |
| 2011/0098420 A1 | 4/2011 | Takizawa et al. | |
| 2011/0210344 A1 | 9/2011 | Han et al. | |
| 2011/0318549 A1 | 12/2011 | Schmidt et al. | |
| 2012/0065294 A1 | 3/2012 | Gajiwala et al. | |
| 2014/0255635 A1 | 9/2014 | Morgan et al. | |
| 2014/0356613 A1 | 12/2014 | Weisenberger et al. | |
| 2015/0284289 A1 | 10/2015 | Gu et al. | |
| 2016/0153288 A1 | 6/2016 | Luthra | |
| 2016/0160664 A1 | 6/2016 | Luthra et al. | |
| 2017/0144329 A1 | 5/2017 | Dunn et al. | |
| 2019/0016892 A1 | 1/2019 | Garcia | |

FOREIGN PATENT DOCUMENTS

| | | |
|---|---|---|
| EP | 3260434 A1 | 12/2017 |
| JP | 04-100875 A | 4/1992 |

OTHER PUBLICATIONS

Eems, LLC "Liquid Polymers" Product Chart, 1 page, eems-llc.com/wp-content/.../Custom_Polycarbosiloxanes_and_Polycarbosilanes.pdf, accessed Jun. 8, 2017.

Eems, LLC, "CSO family of Carbosiloxane Polymers" product listing, 2 pages, eems-llc.com, accessed Jun. 8, 2017.

Matech "Introducing Pre-ceramic Polymers", Distribution A: Approved for Public Release; Distribution is unlimited, 2 pagesm http://matechgsm.com/brochures/PolymerPamphlet.pdf, accessed Jun. 8, 2017.

StarPCSTM SMP-10, "Silicon Carbide Matrix Precursor" Technical Data, http://www.starfiresystems.com/docs/ceramic-forming-polymers/SMP-10.pdf, accessed Jun. 8, 2017.

* cited by examiner

*Cured Control Formulation*     *Cured Preceramic Resin Formulation*

PRECERAMIC RESIN FORMULATIONS, IMPREGNATED FIBERS COMPRISING THE PRECERAMIC RESIN FORMULATIONS, AND RELATED METHODS

CROSS-REFERENCE TO RELATED APPLICATION

This application is a continuation-in-part of U.S. patent application Ser. No. 15/651,970, entitled "PRECERAMIC RESIN FORMULATIONS, CERAMIC MATERIALS COMPRISING THE PRECERAMIC RESIN FORMULATIONS, AND RELATED ARTICLES AND METHODS," filed Jul. 17, 2017, the disclosure of which application is incorporated by reference herein in its entirety.

STATEMENT REGARDING FEDERALLY SPONSORED RESEARCH OR DEVELOPMENT

This invention was made with government support under Contract Number FA8811-16-9-0002 awarded by the United States Department of Defense (Air Force) and under Contract Number W15QKN-14-9-1001 (DOTC-15-01-INIT242) awarded by the United States Department of Defense (Army). The government has certain rights in the invention.

TECHNICAL FIELD

Embodiments of the disclosure relate generally to preceramic resin formulations that are resistant to heat and exhibit a high ceramic yield when ceramified. More particularly, embodiments of the disclosure relate to preceramic resin formulations that include a polycarbosilane polymer, an organically modified silicon dioxide polymer, and, optionally, at least one filler, impregnated fibers and composite materials including the preceramic resin formulations, and related methods of forming the composite materials.

BACKGROUND

Silicon carbide (SiC) and other ceramic materials are used to produce articles having high structural and mechanical strength at a temperature above 1,200° C. (2,200° F.). The articles are commonly used in aerospace and other industries needing resistance to heat. As operation temperatures increase above 1,200° C., material options for the articles decrease exponentially because metal and metal alloys are not viable. While ceramic matrix composites (CMCs) and carbon-carbon (C—C) materials are conventionally used at these temperatures, these materials are expensive and time intensive to produce by conventional precursor impregnation and pyrolysis, slurry infiltration, reactive melt infiltration, or chemical vapor infiltration techniques. Processing of the CMCs and C—C materials requires multiple heat treatments and processing acts to densify the materials and provide the desired strength. Producing CMCs requires several infiltration cycles, which increases the overall cost and amount of time to fabricate the CMCs. Additionally, conventional furnaces used to produce the articles are not sufficiently large to accommodate large articles, such as those needed for large rocket motors.

One method of forming SiC and other ceramic materials is from preceramic polymers. However, conventional preceramic polymers, such as polycarbosilanes, have a low viscosity (less than about 200 cP), which limits their practical use in the preparation of CMCs where the preceramic polymer provides the matrix of the CMC. One commonly-used preceramic polymer is polycarbosilane. However, the polycarbosilane has limited use due to its low viscosity and extensive cracking after curing at, for example, 121° C. (250° F.). Additionally, the ceramic materials formed from conventional preceramic polymers exhibit high mass loss, extensive cracking at low temperature (less than about 121° C.), high porosity, and high shrinkage. Cracking of the ceramic material is worsened as high loading of fillers is needed, rendering the ceramic material formed from the conventional preceramic polymers ineffective. Viscosity modifiers or cracking mitigation additives have been used with conventional preceramic polymers. However, with the modifiers or additives, a low ceramic yield is observed at a temperature greater than about 816° C. (about 1500° F.) Polycarbosilane has also been combined with a polysiloxane, such as polydimethylsiloxane, to improve its viscosity. However, the ceramic yield of the resulting ceramic material was unacceptably low.

Surfactants (e.g., surface active agents) have been used with epoxy resins based on a diglycidyl ether of bisphenol A. The surfactant improves fiber strength translation and prepreg uniformity of composite pressure vessels formed from the epoxy resin.

BRIEF SUMMARY

In accordance with some embodiments described herein, a preceramic resin formulation is disclosed. The preceramic resin formulation comprises a polycarbosilane preceramic polymer and an organically modified silicon dioxide preceramic polymer.

In accordance with other embodiments, a preceramic resin formulation comprising an organically modified silicon dioxide preceramic polymer and at least one filler is disclosed. The preceramic resin formulation is formulated to exhibit a viscosity of from about 200 cP at about 25° C. to about 5,000 cP at a temperature of about 25° C.

In additional embodiments, a ceramic material comprising a reaction product of the polycarbosilane preceramic polymer and the organically modified silicon dioxide preceramic polymer is disclosed.

In accordance with other embodiments, impregnated fibers comprising fibers and a preceramic resin formulation comprising an organically modified silicon dioxide preceramic polymer and at least one filler is disclosed. The at least one filler comprises first particles having an average mean diameter of less than about 1.0 μm and second particles having an average mean diameter of from about 1.5 μm to about 5 μm.

In accordance with other embodiments, a composite material comprising fibers and a reaction product of a polycarbosilane preceramic polymer, an organically modified silicon dioxide preceramic polymer, and at least one filler is disclosed. The at least one filler comprises first particles having an average mean diameter of less than about 1.0 μm and second particles having an average mean diameter of from about 1.5 μm to about 5 μm.

In further embodiments, a method of forming a preceramic resin formulation is disclosed and comprises combining the polycarbosilane preceramic polymer, the organically modified silicon dioxide preceramic polymer, and a cross-linking agent.

In yet other embodiments, a method of forming the ceramic material is disclosed and comprises forming the preceramic resin formulation, curing the preceramic resin formulation to form a cured preceramic resin formulation, and ceramifying the cured preceramic resin formulation to form the ceramic material.

In still other embodiments, a method of forming a composite material is disclosed and comprises passing fibers through a preceramic resin formulation. The preceramic resin formulation comprises an organically modified silicon dioxide preceramic polymer. The fibers are impregnated with the preceramic resin formulation and the impregnated fibers are formed into a composite material.

In yet still other embodiments, an article is disclosed. The article comprises a reaction product of a polycarbosilane preceramic polymer and an organically modified silicon dioxide preceramic polymer, the article configured as a component of a rocket motor or of a high temperature aerostructure.

DETAILED DESCRIPTION

A composite material having a low mass loss and a high ceramic yield is disclosed, as are methods of forming the composite material. The composite material is formed from a preceramic resin formulation having a tailorable viscosity. The composite material is formed into a ceramic matrix composite (CMC) when heated to a temperature greater than about 816° C. (greater than about 1500° F.), such as greater than about 1,200° C. or greater than about 1,649° C. The preceramic resin formulation includes at least one silicon carbide precursor, at least one silicon dioxide precursor, and, optionally, at least one filler. By appropriately selecting viscosities of the silicon carbide precursor and the silicon dioxide precursor and particle size and loading of the filler, the preceramic resin formulation viscosity is tailorable for use in a wet filament winding process. After curing, the preceramic resin formulation functions as a matrix of the composite material, with fibers, such as carbon fibers, in the matrix. The composite material is formed with the carbon fibers by the wet filament winding process, enabling the composite material to be formed at a significantly lower cost (about $100,000) compared to conventional CMCs (about $1,000,000). The composite material may, optionally, be ceramified to produce the CMC. The wet filament winding process also enables the composite material to be produced by a semi-automated process or an automated process. The composite material and CMC may be used in a wide variety of applications, such as in cost sensitive, high temperature applications.

The composite materials and CMCs according to embodiments of the disclosure have a ceramic yield of greater than about 90% and a mass loss of less than about 10% when cured at from about 0° C. to about 400° C. or when ceramified at about 1,200° C. or higher. Since little mass is lost during cure and/or ceramification, the composite materials and CMCs retain their shape and structural functionality without using the extensive fabrication required to produce conventional CMCs. The low mass loss corresponds to low porosity of the composite materials and CMCs, eliminating the need for infiltration cycles, which are performed in conventional CMCs and are time consuming. The wet filament winding process enables the composite materials and CMCs to be formed at reduced fabrication time (from about 7 days to about 10 days) compared to conventional CMC fabrication techniques (from about 30 days to about 90 days or longer).

The preceramic resin formulation including at least one silicon carbide precursor and at least one silicon dioxide precursor is disclosed. The preceramic resin formulation may, optionally, include at least one filler. The silicon carbide precursor and silicon dioxide precursor differ in viscosity, enabling a viscosity of the preceramic resin formulation to be tailored by adjusting the relative amounts of the silicon carbide precursor and silicon dioxide precursor in the preceramic resin formulation. The filler in the preceramic resin formulation provides heat resistance to the CMC and is selected to provide minimal effect on the viscosity of the preceramic resin formulation. The tailorable viscosity of the preceramic resin formulation increases the extent and nature of applications in which the preceramic resin formulation may be used. By way of example only, the viscosity of the preceramic resin formulation may be tailored so that the preceramic resin formulation may be used to prepare CMCs where the preceramic resin formulation functions as the matrix of the CMC and the matrix is reinforced with the carbon fibers. The preceramic resin formulation and the carbon fibers may be cured (e.g., crosslinked) and ceramified (e.g., pyrolyzed) to form a ceramic material (e.g., the CMC). The ceramic material formed from the preceramic resin formulation may be formulated to exhibit desired material properties (e.g., rheological properties, mechanical properties, physical properties, chemical properties, thermal properties). The ceramic material exhibits a low mass loss, a high ceramic yield, and a low porosity when ceramified at a temperature greater than about 816° C. (greater than about 1500° F.), such as greater than about 1,200° C. or greater than about 1,649° C. (about 3,000° F.). The ceramic material exhibits improved performance properties (e.g., strength) than each of the preceramic precursors individually. The tailorable viscosity of the preceramic resin formulation may be achieved without losing ceramic yield during the conversion to the ceramic material. An article formed from the ceramic material also exhibits reduced or no cracking. The article may be produced by conventional composite fabrication methods, reducing the complexity and cost of fabricating the article.

As used herein, the term "ceramic material" means and includes a reaction product of the silicon carbide precursor and silicon dioxide precursor following cure and ceramification of the preceramic resin formulation.

As used herein, the term "ceramic yield" means and includes a residual mass of the composite material or ceramic material remaining after cure at from about 0° C. to about 400° C. and/or ceramification of the preceramic resin formulation at a temperature of about 1,200° C. or greater.

As used herein, the term "composite material" means and includes a reaction product of the silicon carbide precursor and silicon dioxide precursor following cure of the preceramic resin formulation and before ceramification.

As used herein, the term "cured preceramic resin formulation" means and includes the preceramic resin formulation after curing and before ceramifying.

As used herein, the term "preceramic" means and includes a polymer material that is converted to a ceramic material when heated to a temperature of greater than about 816° C. (greater than about 1500° F.).

As used herein, the term "preceramic resin formulation" means and includes a formulation of the silicon carbide precursor and silicon dioxide precursor before curing and ceramifying.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a pre-determined way.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially," in reference to a given parameter, property, or condition, means to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "about" in reference to a given parameter is inclusive of the stated value and has the meaning dictated by the context (e.g., it includes the degree of error associated with measurement of the given parameter).

The following description provides specific details, such as materials, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing the article from the preceramic resin formulation. Only those process acts and structures necessary to understand the embodiments of the disclosure are described in detail below. Additional acts to form the article from the preceramic resin formulation may be performed by conventional techniques. Also note, any drawings accompanying the application are for illustrative purposes only, and are thus not drawn to scale. Additionally, elements common between figures may retain the same numerical designation.

The silicon carbide precursor and silicon dioxide precursor may differ in viscosity from one another by at least one order of magnitude. The silicon carbide precursor may, for example, have a viscosity of less than or equal to about 250 cP at a temperature of about 25° C. while the silicon dioxide precursor may have a viscosity of greater than or equal to about 2,500 cP at a temperature of about 25° C. While embodiments herein describe the silicon carbide precursor as having a lower viscosity than the silicon dioxide precursor, the silicon carbide precursor may have a higher viscosity than the silicon dioxide precursor as long as the viscosities of the two preceramic precursors differ by at least one order of magnitude. By selecting the viscosities of each of the silicon carbide precursor and silicon dioxide precursor, the viscosity of the preceramic resin formulation may be tailored as desired.

The silicon carbide precursor is a polycarbosilane preceramic polymer formed of monomers having the following chemical structure:

where $R_1$ and $R_2$ of each monomer is independently a hydrogen (H) group, a methyl ($CH_3$) group, or a vinyl group ($CH_2$=CH) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. At least a portion of the monomers in the polycarbosilane preceramic polymer include the vinyl group as $R_1$ or $R_2$ to enable crosslinking with the organically modified silicon dioxide preceramic polymer during cure of the preceramic resin formulation. The amount of vinyl groups in the polycarbosilane preceramic polymer may be sufficient to crosslink the preceramic resin formulation. The polycarbosilane preceramic polymer may include at least about 0.01 vinyl eq/kg, such as from about 0.2 vinyl eq/kg to about 5.0 vinyl eq/kg. The polycarbosilane preceramic polymer may also include at least about 0.01 hydride eq/kg, such as from about 0.2 hydride eq/kg to about 10 hydride eq/kg. The polycarbosilane preceramic polymer may be photocurable, chemically curable, or thermally curable.

By selecting the $R_1$ and $R_2$ groups of each monomer and the degree of polymerization (i.e., the number of monomer repeat units), a desired viscosity of the polycarbosilane preceramic polymer may be achieved. The polycarbosilane preceramic polymer is formulated to exhibit a viscosity of less than or equal to about 250 cP at a temperature of about 25° C., such as from about 1 cP to about 250 cP at about 25° C., from about 1 cP to about 200 cP at about 25° C., from about 1 cP to about 100 cP at about 25° C., from about 10 cP to about 250 cP at about 25° C., from about 10 cP to about 200 cP at about 25° C., from about 40 cP to about 250 cP at about 25° C., from about 40 cP to about 200 cP at about 25° C., from about 40 cP to about 120 cP at about 25° C., from about 40 cP to about 100 cP at about 25° C., from about 5 cP to 8 cP at about 25° C., from about 4 cP to about 7 cP at about 25° C., from about 8 cP to about 12 cP at about 25° C., from about 8 cP to about 15 cP at about 25° C., or from about 200 cP to about 250 cP at about 25° C. In some embodiments, the polycarbosilane preceramic polymer has a viscosity of from about 40 cP to about 120 cP at about 25° C.

Such polycarbosilane preceramic polymers are commercially available from numerous sources including, but not limited to, EEMS, LLC (Saratoga Springs, N.Y.), Starfire Systems, Inc. (Schenectady, N.Y.), or Matech (Westlake Village, Calif.). The polycarbosilane preceramic polymer may include, but is not limited to, SMP-10, StarPCS® SMP-500, or StarPCS® SMP-877 silicon carbide precursor from Starfire Systems, Inc. (Malta, N.Y.). Additional polycarbosilane preceramic polymers are commercially available from EEMS, LLC as MS 208, MS 272, MS 250, MS 440, CSO 110, or CSO 116. The polycarbosilane preceramic polymer may also include a combination of polycarbosilane preceramic polymers or a combination of the polycarbosilane preceramic polymer with at least one other polymer, such as a polysiloxane or other compatible polymer. The polycarbosilane preceramic polymer may be available at a relatively low cost, such as less than about $100/pound. Commercially available polycarbosilane preceramic polymers may also include a combination of the polycarbosilane preceramic polymer.

The silicon dioxide precursor is an organically modified silicon dioxide preceramic polymer formed of monomers having the following chemical structure:

where each of $R_3$ and $R_4$ is independently a methyl ($CH_3$) group or a vinyl group ($CH_2$=CH) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. The organically modified silicon dioxide preceramic polymer includes a quaternary coordinated (QC) oxygen to silicon atom and may also be referred to as a QC silicon dioxide preceramic polymer. At least a portion of the monomers in the organically modified silicon dioxide preceramic polymer may, optionally, include the vinyl group as $R_3$ or $R_4$ to enable crosslinking with the polycarbosilane preceramic polymer during cure of the preceramic resin formulation. The organically modified silicon dioxide preceramic polymer may include from about 0 vinyl eq/kg to about 5.0 vinyl eq/kg, such as from about 0.18 vinyl eq/kg to about 0.3 vinyl eq/kg. The organically modified silicon dioxide preceramic polymer may be photocurable, chemically curable, or thermally curable.

$R_3$ and $R_4$ of each monomer of the organically modified silicon dioxide preceramic polymer and the degree of polymerization are selected to provide the desired viscosity to the organically modified silicon dioxide preceramic polymer. The organically modified silicon dioxide preceramic polymer also has a low carbon content and a high degree of quaternary coordinated oxygen to the silicon atoms in the polymer chain. The organically modified silicon dioxide preceramic polymer is formulated to exhibit a viscosity greater than about 200 cP at a temperature of about 25° C., such as greater than about 2,500 cP at a temperature of about 25° C., from about 3,000 cP to about 100,000 cP at about 25° C., from about 4,000 cP to about 100,000 cP at about 25° C., from about 5,000 cP to about 100,000 cP at about 25° C., from about 6,000 cP to about 100,000 cP at about 25° C., from about 4,500 cP to about 7,000 cP at about 25° C., from about 40,000 cP to about 80,000 cP at about 25° C., from about 45,000 cP to about 75,000 cP at about 25° C., from about 50,000 cP to about 70,000 cP at about 25° C., or from about 50,000 cP to about 60,000 cP at about 25° C. In some embodiments, the organically modified silicon dioxide preceramic polymer has a viscosity of from about 50,000 cP to about 60,000 cP at a temperature of about 25° C. In other embodiments, the organically modified silicon dioxide preceramic polymer has a viscosity of from about 4,500 cP to about 7,000 cP at about 25° C.

Such organically modified silicon dioxide preceramic polymers are commercially available from numerous sources including, but not limited to, Gelest, Inc. (Morrisville, Pa.). The organically modified silicon dioxide preceramic polymer may include, but is not limited to, VQM 135, VQM 135R, VQM 146, or combinations thereof.

The preceramic resin formulation also includes a crosslinking agent, such as a radical initiator, a cationic initiator, or a hydrosilylation catalyst. The crosslinking agent initiates crosslinking of the polycarbosilane preceramic polymer and organically modified silicon dioxide preceramic polymer by reacting the vinyl groups with silicon-hydrogen groups in the preceramic resin formulation. The radical initiator may be a peroxide compound or an azo compound used to cure (e.g., crosslink) the polycarbosilane preceramic polymer and the organically modified silicon dioxide preceramic polymer. The peroxide compound may include, but is not limited to, benzoyl peroxide, dicumyl peroxide, bis-(2,4-dichlorobenzoyl)-peroxide, or combinations thereof. The azo compound may include, but is not limited to, azobisisobutyronitrile. The cationic initiator may include a protonic acid, a Lewis acid/Friedel-Crafts catalyst (e.g., $SnCl_4$, $AlCl_3$, $BF_3$, and $TiCl_4$), carbenium ion salts (e.g., with trityl or tropylium cations), or through ionizing radiation. The hydrosilylation catalyst may be a transition metal catalyst, such as platinum, rhodium, ruthenium iridium, palladium, nickel, cobalt, iron, manganese, or combinations thereof. In some embodiments, the crosslinking agent is a platinum catalyst. The crosslinking agent may be present at an amount sufficient to react (e.g., crosslink) the polycarbosilane preceramic polymer and organically modified silicon dioxide preceramic polymer and at least partially depends on the polycarbosilane preceramic polymer and organically modified silicon dioxide preceramic polymer used, as well as on the desired cure time of the preceramic resin formulation. The crosslinking agent may, for example, be present in the preceramic resin formulation at from about 0.01 parts per hundred parts of resin (phr) to about 2.5 phr, such as from about 0.5 phr to about 2.0 phr, or about 1.0 phr.

The preceramic resin formulation may include optional components (e.g., additives) to provide desirable properties to the ceramic material formed from the preceramic resin formulation. If present, the additive may be at least one compound that enhances at least one material property (e.g., ceramic yield, extent of cracking) of the ceramic material to be formed from the preceramic resin formulation. By way of example only, the additive may be a cure accelerator, an adhesion promoter, a lubricant, a filler, a pigment, or combinations thereof. Such additives are known in the art and are not described in detail herein. In some embodiments, the preceramic resin formulation is substantially free of additives other than the crosslinking agent. Thus, the preceramic resin formulation consists essentially of or consists of the polycarbosilane preceramic polymer, organically modified silicon dioxide preceramic polymer, and the crosslinking agent.

The filler in the preceramic resin formulation may be a material that is resistant to temperatures to which the composite material or CMC is exposed during use and operation. The filler may have a melting point of between about 1,800° C. and about 4,000° C., such as between about 2,000° C. and about 3,900° C. The filler is also thermally stable at a temperature above about 1,649° C. (about 3,000° F.). The filler does not degrade at processing temperatures and, therefore, improves the ceramic yield. The filler also exhibits a low density, minimizing the overall mass of the CMC. The density of the filler may be between 1.8 g/ml and 13.0 g/ml, such as between about 2.0 g/ml and about 12.5 g/ml, or between about 2.1 g/ml and about 12.2 g/ml. The filler also exhibits a low effect on the viscosity of the preceramic resin formulation, even at high filler loading. The filler may include, but is not limited to, silicon carbide, hafnium carbide, tantalum carbide, niobium carbide, zirconium carbide, tungsten carbide, molybdenum carbide, zirconium oxide, aluminum oxide, hafnium oxide, magnesium oxide, thorium oxide, boron nitride, hafnium nitride, tantalum nitride, zirconium nitride, titanium nitride, titanium diboride, hafnium diboride, tantalum diboride, zirconium diboride, tungsten boride, or combinations thereof. The filler is commercially available from various sources, such as Momentive Performance Materials Inc. (Waterford, N.Y.) or Panadyne Inc. (Montgomeryville, Pa.). In some embodiments, the filler is zirconium oxide and titanium diboride.

The filler, when present, may be selected to enable a high filler loading and high ceramic yield while having a minimal effect on the preceramic resin formulation viscosity, a minimal effect on mechanical properties, and a minimal mass loss of the CMC. Generally, as the amount of filler in the preceramic resin formulation increases, the viscosity of the preceramic resin formulation increases and mechanical property degradation is observed. Therefore, the amount of filler in the preceramic resin formulation is a balance between high loading and the viscosity of the preceramic resin formulation. The filler may be present in the preceramic resin formulation at up to 65% by weight (wt %) with respect to the resin, such as from about 1 wt % to about 65 wt %, from about 1 wt % to about 35 wt %, from about 5 wt % to about 30 wt %, from about 10 wt % to about 25 wt %, from about 15 wt % to about 20 wt %, from about 35 wt % to about 65 wt %, from about 40 wt % to about 60 wt %, from about 45 wt % to about 55 wt %, from about 45 wt % to about 65 wt %, or from about 50 wt % to about 65 wt %. At a low filler loading, the CMC formed from the preceramic resin formulation may be more porous than that formed from a preceramic resin formulation having a higher filler loading. Therefore, if a porous CMC is desired, a low amount of filler may be present in the preceramic resin formulation. However, if a nonporous CMC is desired, a higher amount of the filler may be used. Without being bound to any theory, it is believed that having at least 10 wt % of the filler in the preceramic resin formulation minimizes mass loss of the composite material or CMC following ceramification.

Particle size of the filler may also affect the viscosity and filler loading of the preceramic resin formulation. To achieve a desired balance between the viscosity and filler loading, the filler may have an average mean diameter of less than or equal to the average mean diameter of filaments of the carbon fibers present in the composite material or CMC. By way of example only, if the carbon fibers include a carbon fiber tow, the filler may have an average mean diameter of less than or equal to the average mean diameter of a filament of the carbon fiber tow. The average mean diameter of the filler may be sufficiently small so as not to displace the carbon fibers in the composite material or CMC. The average mean diameter of the filler may be appropriately selected for positioning of the filler between individual carbon fibers and for positioning in spaces between tows or layers of the carbon fibers. The filler may have an average mean diameter of from about 0.1 µm to about 150 µm, such as from about 0.1 µm to about 50 µm, from about 0.1 µm to about 40 µm, from about 0.1 µm to about 30 µm, from about 0.1 µm to about 20 µm, from about 0.1 µm to about 10 µm, from about 0.1 µm to about 5 µm, from about 0.5 µm to about 40 µm, from about 0.5 µm to about 30 µm, from about 0.5 µm to about 20 µm, from about 0.5 µm to about 10 µm, from about 0.5 µm to about 5 µm, from about 0.5 µm to about 1 µm, from about 1 µm to about 50 µm, from about 1 µm to about 40 µm, from about 1 µm to about 30 µm, from about 1 µm to about 20 µm, from about 1 µm to about 10 µm, from about 2 µm to about 8 µm, or from about 2 µm to about 5 µm.

The filler may be present in two or more particle sizes or particle size ranges, where the particle sizes are selected to improve packing efficiency and loading of the filler in the preceramic resin formulation. For instance, a small particle size filler may have an average mean diameter of less than about 1.0 µm and a large particle size filler may have an average mean diameter of from about 1.5 µm to about 5 µm. The small particle size filler may be located between individual carbon fiber filaments of the composite material or CMC, such as in interfilament spaces between the carbon fiber filaments. The large particle size filler may be located in spaces between tows or layers of the carbon fibers of the composite material or CMC, such as in inter-composite ply spaces. In some embodiments, the small particle size filler has an average mean diameter of from about 0.5 μm to about 0.6 μm and the large particle size filler has an average mean diameter of from about 2 μm to about 5 μm. The filler may also include two or more fillers, with each filler having a different particle size or particle size range. If, for example, two fillers are used, the two fillers may be present at a ratio of 1:1, 1:2, 1:3, 1:4, 2:1, 3:1, or 4:1. In some embodiments, the two fillers are present at a ratio of 2:1.

The particle size of the filler may also affect the viscosity and filler loading of the preceramic resin formulation. The amount of small particle size filler present in the preceramic resin formulation may be limited by the effect on viscosity, which increases at higher filler loading. Using the large particle size filler may enable a higher filler loading with a smaller effect on the viscosity of the preceramic resin formulation. By using the different particle size fillers, a desired amount of filler may be present in the preceramic resin formulation without negatively affecting its viscosity.

In some embodiments, zirconium oxide and titanium diboride are present in the preceramic resin formulation. The zirconium oxide is present at an average mean diameter of about 0.6 μm and the titanium diboride is present at an average mean diameter of about 3 μm and the ratio of zirconium oxide:titanium diboride is 2:1. The zirconium oxide and titanium diboride are present at 65 wt % with respect to the resin.

Boron nitride may, optionally, be present in the preceramic resin formulation as an additive to improve mechanical properties of the CMC. The boron nitride may improve the carbon fiber/matrix interface, enabling slippage between the carbon fibers and the matrix of the CMC.

The preceramic resin formulation may include from about 10% by weight (wt %) to about 90 wt % of the polycarbosilane preceramic polymer and from about 10 wt % to about 90 wt % of the organically modified silicon dioxide preceramic polymer. The amount of each of the polycarbosilane preceramic polymer and the organically modified silicon dioxide preceramic polymer present in the preceramic resin formulation may be selected depending on the desired properties of the composite material or ceramic material to be formed. In some embodiments, the preceramic resin formulation includes 80 wt % of the polycarbosilane preceramic polymer, 20 wt % of the organically modified silicon dioxide preceramic polymer, the filler at about 65 wt % of the resin, and about 1.0 phr of the crosslinking agent. By way of example only, the polycarbosilane preceramic polymer is CSO-110 from EEMS, LLC and is present at about 100 parts, the organically modified silicon dioxide preceramic polymer is VQM-146 from Gelest, Inc. and is present at about 25 parts, 65 wt % of the filler is present with respect to the resins, and the crosslinking agent is a platinum catalyst (EEMS CLC-PL005) and is present at about 1 part.

While preceramic resin formulations including polysiloxanes and a polycarbosilane preceramic polymer have been previously used, the composite materials or CMCs resulting from these preceramic polymers had a low ceramic yield. It was surprising and unexpected for the preceramic resin formulation including the polycarbosilane preceramic polymer, the organically modified silicon dioxide preceramic polymer, and the filler to produce composite materials or CMCs having a high ceramic yield. Therefore, by using the polycarbosilane and the organically modified silicon dioxide preceramic polymers, the ceramic yield may be maximized.

The preceramic resin formulation may be formed by mixing the polycarbosilane preceramic polymer, the organically modified silicon dioxide preceramic polymer, the filler, and the crosslinking agent, along with any optional additives. The polycarbosilane preceramic polymer, organically modified silicon dioxide preceramic polymer, filler, and crosslinking agent may be mixed by conventional techniques, such as by hand, using a high shear mixer, or using a planetary mixer. Mixing the components under vacuum may remove gases from the preceramic resin formulation, which inhibits the formation of voids or pores during curing and during the conversion of the preceramic resin formulation to the ceramic material. The components may be mixed under inert conditions, such as under argon. The polycarbosilane preceramic polymer, organically modified silicon dioxide preceramic polymer, filler, and crosslinking agent may be mixed for an amount of time sufficient to form a substantially homogeneous preceramic resin formulation (e.g., the polycarbosilane preceramic polymer, organically modified silicon dioxide preceramic polymer, filler, and crosslinking agent may be uniformly dispersed throughout the preceramic resin formulation), or may be heterogeneous (e.g., at least one of the polycarbosilane preceramic polymer, organically modified silicon dioxide preceramic polymer, filler, and crosslinking agent may be non-uniformly dispersed throughout the preceramic resin formulation). In some embodiments, the preceramic resin formulation is substantially homogeneous as formed. Organic solvents may, optionally, be used to form the preceramic resin formulation. During mixing, the preceramic resin formulation may be maintained at a temperature below the lowest cure temperature of each of the components. In one embodiment, the polycarbosilane preceramic polymer, organically modified silicon dioxide preceramic polymer, filler, and crosslinking agent are maintained at room temperature (from about 20° C. to about 25° C.) during mixing. A water-cooled jacket may be used, as needed, to maintain the preceramic resin formulation at or near room temperature to inhibit potential reactions from occurring during the mixing.

The preceramic resin formulation exhibits a viscosity within a range of from about 200 cP at about 25° C. to about 5,500 cP at a temperature of about 25° C., such as from about 800 cP at about 25° C. to about 5,000 cP at a temperature of about 25° C. or from about 1,000 cP at about 25° C. to about 5,000 cP at a temperature of about 25° C. The preceramic resin formulation also exhibits a room temperature pot life.

The carbon fibers may include, but are not limited to, polyacrylonitrile (PAN) fibers or pitch fibers and may be in tow form or fabric form. The carbon fibers of the CMC may be compatible with the components (e.g., ingredients) of the preceramic resin formulation. The carbon fibers may include a sizing coating or may be used without a sizing coating. The carbon fibers may additionally be coated, such as with a boron nitride coating, to enable slippage of the carbon fibers during loading. Suitable carbon fibers are commercially available from various sources, such as HEXTOW® IM7-R-12K from Hexcel Corp. (Stamford, Conn.) or graphite fiber YSH60A-A2S-12K from Nippon Graphite Fiber Corp. (Hyogo, Japan). Since carbon fibers cost between $40 per pound and $200 per pound, compared to between $1,000 per pound and $5,000 per pound for ceramic fibers, the cost of the composite material or CMC is decreased compared to a CMC that includes ceramic fibers. In some embodiments, the carbon fibers are pitch fibers, which provide better thermal properties and higher strength under oxidative environments.

While embodiments of the composite material or CMC described herein include the carbon fibers, other fibers, such as ceramic fibers (SiC), glass fibers (E-glass, S2 glass), aramid fibers (e.g., KEVLAR®), polyethylene fibers (e.g., SPECTRA®), coated carbon fibers (BN coated carbon fibers, BN/SiC coated carbon fibers), carbon fibers with a surface converted to SiC, or combinations thereof, may be used depending on the intended use of the CMC and its cost sensitivity. By way of example only, CMCs used in turbine components have a functional life of greater than about 10,000 hours and need to withstand thermal cycling with little decrease in mechanical properties. In these CMCs, ceramic fibers may be used instead of the carbon fibers. For applications having shorter functional lives (e.g., less than about 30 minutes), such as in rocket motor nozzles, the carbon fibers may be used.

The preceramic resin formulation and carbon fibers are formed into a desired shape by coating, casting into a mold, dispensing from a container onto a surface as an adhesive or sealant, hand placement (lay up), molding, such as vacuum bag molding or resin transfer molding, filament winding, such as wet filament winding, another suitable process, or combinations thereof. In some embodiments, the preceramic resin formulation and carbon fibers are formed into the composite material or CMC by a wet filament winding process. To form the composite material or CMC, the carbon fibers are impregnated with the preceramic resin formulation. The carbon fibers may be passed through (e.g., dipped or otherwise immersed) in a bath containing the preceramic resin formulation. Since the preceramic resin formulation is viscous, the preceramic resin formulation may impregnate into the carbon fibers, wetting the carbon fibers. The carbon fibers may, alternatively, be coated with the preceramic resin formulation, such as by brushing or otherwise applying the preceramic resin formulation to the carbon fibers. Once cured and ceramified, the preceramic resin formulation functions as the matrix of the composite material or CMC, with the carbon fibers embedded in the matrix.

The preceramic resin formulation and carbon fibers are used at a range of from about 15 volume percent of the preceramic resin formulation:about 85 volume percent of the carbon fibers to about 85 volume percent of the preceramic resin formulation:about 15 volume percent of the carbon fibers, such as about 15 volume percent of the preceramic resin formulation:about 85 volume percent of the carbon fibers, about 25 volume percent of the preceramic resin formulation:about 75 volume percent of the carbon fibers, about 35 volume percent of the preceramic resin formulation:about 65 volume percent of the carbon fibers, about 40 volume percent of the preceramic resin formulation:about 60 volume percent of the carbon fibers, or about 80 volume percent of the preceramic resin formulation:about 20 volume percent of the carbon fibers.

The impregnated carbon fibers may be formed (e.g., fabricated) into a desired configuration or shape of the composite material or CMC depending on the intended use of the composite material or CMC. By way of example only, the impregnated carbon fibers may be directly formed into a desired shape by coating, casting into a mold, dispensing from a container onto a surface as an adhesive or sealant, hand placement (lay up), molding, such as vacuum bag molding or resin transfer molding, filament winding, such as wet filament winding, another suitable process, or combinations thereof. Once formed into the desired shape, the carbon fibers impregnated with the preceramic resin formulation are cured (e.g., crosslinked) to form the composite material as a rigid solid and, optionally, ceramified (e.g., pyrolyzed) to form the ceramic material (e.g., CMC). The composite material may exhibit sufficient strength and mechanical properties after curing that ceramification is optional. The composite material or CMC is, therefore, directly formed into a net shape or near-net shape in that the carbon fibers impregnated with the preceramic resin formulation are formed into the desired shape by the wet winding process and not into a tape or other configuration that is subsequently formed in the desired shape.

The impregnated carbon fibers may be exposed to one or more heat treatments to cure the resin matrix and form the composite material as a rigid solid. The composite material may, optionally, be ceramified to form the CMC. The conditions used to cure the impregnated carbon fibers may be selected depending on the specific polycarbosilane preceramic polymer and organically modified silicon dioxide preceramic polymer present in the preceramic resin formulation. The cure temperature of the impregnated carbon fibers may range from about 0° C. (about 32° F.) to about 400° C. (about 752° F.), such as from about 20° C. to about 371° C. (700° F.), from about 121° C. (about 250° F.) to about 371° C. (700° F.), or from about 20° C. to about 121° C. (about 250° F.). Depending on the cure temperature, the impregnated carbon fibers may be cured in an amount of time ranging from a few seconds (e.g., photoinitiated cure) to a few days. The impregnated carbon fibers may be cured in hours, such as from about one hour to about thirty hours, from about four hours to about twenty hours, or from about six hours to about ten hours. By increasing the cure temperature, a shorter amount of time may be needed to cure the impregnated carbon fibers. Conversely, by decreasing the cure temperature, a longer amount of time may be needed to cure the impregnated carbon fibers. The curing of the impregnated carbon fibers may be conducted using conventional processing equipment, which is not described in detail herein. During curing, the polycarbosilane preceramic polymer and organically modified silicon dioxide preceramic polymer in the preceramic resin formulation react (e.g., crosslink), forming a hardened composite material. Thus, the composite material includes a reaction product of the polycarbosilane preceramic polymer and the organically modified silicon dioxide preceramic polymer. By way of example only, the vinyl groups of the preceramic resin formulation react with silicon-hydrogen bonds during the cure. The curing and higher temperature heat treatments (e.g., ceramifying) may be conducted in a low oxygen environment (e.g., an inert atmosphere environment), such as below 100 ppm of oxygen, to reduce oxidation of the carbon fibers.

If multiple heat treatments are conducted, a first heat treatment may be conducted on the impregnated carbon fibers to initially cure the preceramic precursors of the preceramic resin formulation. After the first heat treatment, the composite material may be machineable. Any machining acts, such as adjusting an outer diameter, to produce the composite material in its desired shape may, therefore, be conducted following the first heat treatment. A second heat treatment may then be conducted to further cure the composite material. By way of example only, the first heat treatment may be conducted at a temperature of 250° F. for four hours, followed by the second heat treatment at 700° F. for two hours.

The composite material is ceramified to further harden the composite material and convert the composite material into the ceramic material (e.g., the CMC). Thus, the ceramic material includes a reaction product of the polycarbosilane preceramic polymer and the organically modified silicon dioxide preceramic polymer. Without being bound by any theory, it is believe that during the cure and ceramification, the preceramic resin formulation is converted into an amorphous silicon-oxy-carbide material with the carbon fibers dispersed therein. The composite material may be exposed to a temperature of greater than about 649° C. (greater than about 1,200° F.), such as a temperature of greater than about 816° C. (greater than about 1,500° F.) or greater than about 1,093° C. (greater than about 2,000° F.) to ceramify the composite material. By way of example only, the ceramification temperature may range from about 816° C. to about 1,093° C. or from about 816° C. to about 1,200° C. or greater. The ceramic yield of the ceramic material or the CMC may be greater than about 50%, such as greater than about 70%, greater than about 75%, greater than about 80%, greater than about 90%, or greater than about 95% when ceramified at these temperatures. Without being bound by any theory, it is believed that the high degree of quaternary coordinate oxygen in the organically modified silicon dioxide preceramic polymer results in the high ceramic yield. When silicon atoms are fully coordinated with oxygen atoms, $SiO_2$ is maintained during the cure and ceramification. The organically modified silicon dioxide preceramic polymer has sufficient organic groups bonded to the silicon atoms to keep the preceramic resin formulation in a polymeric state, which enables ease of blending with other materials. It is also believed that at a temperature of about 1,093° C. (about 2,000° F.), the preceramic resin formulation may be characterized as a semi-amorphous silicon-oxy-carbide material.

By forming the composite material or CMC by the wet winding process, the composite material or CMC may be formed into a net-shape or near-net shape. The impregnated fibers do not need to be formed into a tape or other form, which is then formed into the desired shape. Rather, the composite material or CMC is directly formed from the impregnated fibers. The composite material may also be machineable during a portion of its fabrication, such as machining its outer diameter after the initial curing stage.

For comparison, while preceramic resin formulations including polysiloxanes and a polycarbosilane preceramic polymer have previously been formed, CMCs resulting from such preceramic resin formulations had a low ceramic yield due to the high carbon and oxygen content in the matrix. It was surprising and unexpected to find out that the preceramic resin formulations according to embodiments of the disclosure exhibited a high ceramic yield and a low mass loss, which is believed to be due to the high degree of quaternary coordinated oxygen to the silicon atoms in the polymer chain.

In some embodiments, the impregnated carbon fibers are cured at a temperature of about 121° C. (about 250° F.), subjected to an additional heat treatment at 371° C. (700° F.), and ceramified at a temperature of about 1,093° C. (2,000° F.). In other embodiments, the impregnated carbon fibers are cured and ceramified by a single heat treatment, such as a temperature of about 1,200° C.

In embodiments where the CMC was cured at about 121° C. (about 250° F.) for about four hours, at about 371° C. (about 700° F.) for about two hours, and ceramic conversion at about 1,093° C. (about 2,000° F.) for about 30 minutes, the CMC exhibited low mass loss and a low change in dimensions (e.g., shrinkage). The CMC exhibited less than about 5% shrinkage. In other embodiments, the CMCs were cured using a single heat treatment at 1,200° C. and by a semi-automated process, reducing cost and fabrication time compared to conventional CMC fabrication techniques.

With its heat resistance and reduced cracking, the composite material or the ceramic material (e.g., CMC) formed from the preceramic resin formulation and carbon fibers may be used in a variety of articles, such as in aerospace or other industries. The composite material or the ceramic material according to embodiments of the disclosure may be used to form components of rocket motors or other aerostructures. The composite material or the ceramic material according to embodiments of the disclosure may be used as a structural component of a rocket motor or of a high temperature aerostructure. The composite material or the ceramic material may be used as a component of a nozzle of the rocket motor or of a casing of the rocket motor. The aerostructure may include, but is not limited to, a turbine, a turbine blade, a turbine housing, a turbine engine vane, an insulating tile, a rotor blade, an insulation blanket, a compressor blade, a wing component, a fuselage skin, a landing gear, an exhaust nozzle, an engine exhaust duct, a nose cone, a re-entry shield, or a heat shield. In addition to structural components, the composite material or the ceramic material may be used as an oxidative resistant coating on a rocket motor nozzle or other high temperature aerostructure, a high temperature adhesive, a mortar material for filling cracks or gaps, an insulation, a thermal protection material, or a thermal ablation material. The composite material or the ceramic material according to embodiments of the disclosure may also be used as a bonding material between other components, such as between other components of a rocket motor or other components of an aerostructure. The composite material or the ceramic material may, therefore, be part of a laminate structure that includes aerostructure components or rocket motor components.

The composite material or CMC according to embodiments of the disclosure may be formulated for applications having a short functional life, such as less than about 30 minutes. By way of example only, the composite material or the CMC may be used as a component of a rocket motor nozzle, which is expected to function for less than about 30 minutes during use and operation. In a rocket motor nozzle, the composite material may be ceramified in situ, such as by curing the composite material as described above and then ceramifying the composite material during use and operation of the rocket motor. By changing the fibers, the composite material or CMC may be prepared for applications having a long functional life, such as greater than about 1,000 hours or greater than about 10,000 hours. By way of example only, the CMC may be configured as a turbine component.

Figure 1:
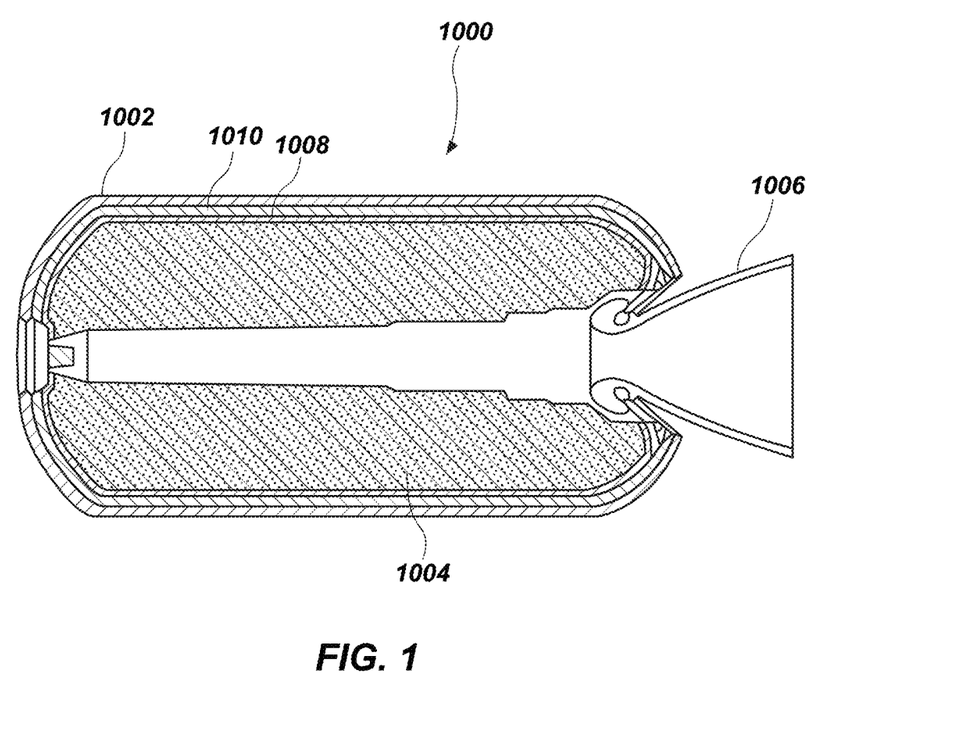
FIG. 1 is a simplified cross-sectional view of a rocket motor including one or more ceramic material components in accordance with embodiments of the disclosure.

FIG. 1 is a simplified cross-sectional view of a rocket motor 1000 (e.g., a solid rocket motor), in accordance with embodiments of the disclosure. The rocket motor 1000 may, for example, be configured to be a component (e.g., stage) of a larger assembly (e.g., a multi-stage rocket motor assembly). As shown in FIG. 1, the rocket motor 1000 includes a casing 1002, a propellant structure 1004 disposed within the casing 1002, and a nozzle assembly 1006 connected to an aft end of the casing 1002. The rocket motor 1000 may also include one or more of a liner structure 1008 and an insulation structure 1010 between the propellant structure 1004 and the casing 1002. For example, the liner structure 1008 may be located on or over the propellant structure 1004, and the insulation structure 1010 may be located on and between the liner structure 1008 and an inner surface of the casing 1002. The components of the rocket motor 1000 may be formed using conventional processes and equipment, which are not described in detail herein. The composite material or ceramic material according to embodiments of the disclosure may be used in one or more components of the rocket motor 1000. By way of example only, at least a portion of the nozzle assembly 1006 or the casing 1002 may be formed of the ceramic material according to embodiments of the disclosure.

While embodiments described herein refer to preceramic precursors of silicon carbide and silicon dioxide, the preceramic precursor of silicon dioxide may also be used with preceramic precursors of other ceramics, such as preceramic precursors of silicon carbide, preceramic precursors of silicon nitride, preceramic precursors of silicon hexaboride, preceramic precursors of aluminum nitride, preceramic precursors of boron nitride, preceramic precursors of boron carbide, preceramic precursors of titanium boride, preceramic precursors of titanium carbide, and preceramic precursors of hafnium carbide.

The following examples serve to explain embodiments of the disclosure in more detail. These examples are not to be construed as being exhaustive or exclusive as to the scope of this disclosure.

EXAMPLES

Example 1

Precursor Resin Formulation

A preceramic resin formulation including 100 parts of a polycarbosilane preceramic polymer commercially available from EEMS, LLC as CSO-110, 25 parts of a organically modified silicon dioxide preceramic polymer commercially available from Gelest, Inc. as VQM-146, and 1 part of a platinum catalyst commercially available from EEMS as CLC-PL005 was prepared. The CSO-110, VQM-146, and platinum catalyst were combined to produce the preceramic resin formulation including 80 wt % CSO-110 and 20 wt % of the VQM-146. A control formulation including only CSO-110 was also produced.

The preceramic resin formulation and the control formulation were exposed to 121° C. (250° F.) for 4 hours to cure the preceramic resin formulation and the control formulation, and then ceramified at a temperature of about 900° C. for 2 hours to produce the respective ceramic materials. A post-cure after the 121° C. (250° F.) cure was performed at 370° C. (700° F.) for an additional 4 hours.

Example 2

Ceramic Yield and Mechanical Integrity

Figure 2:
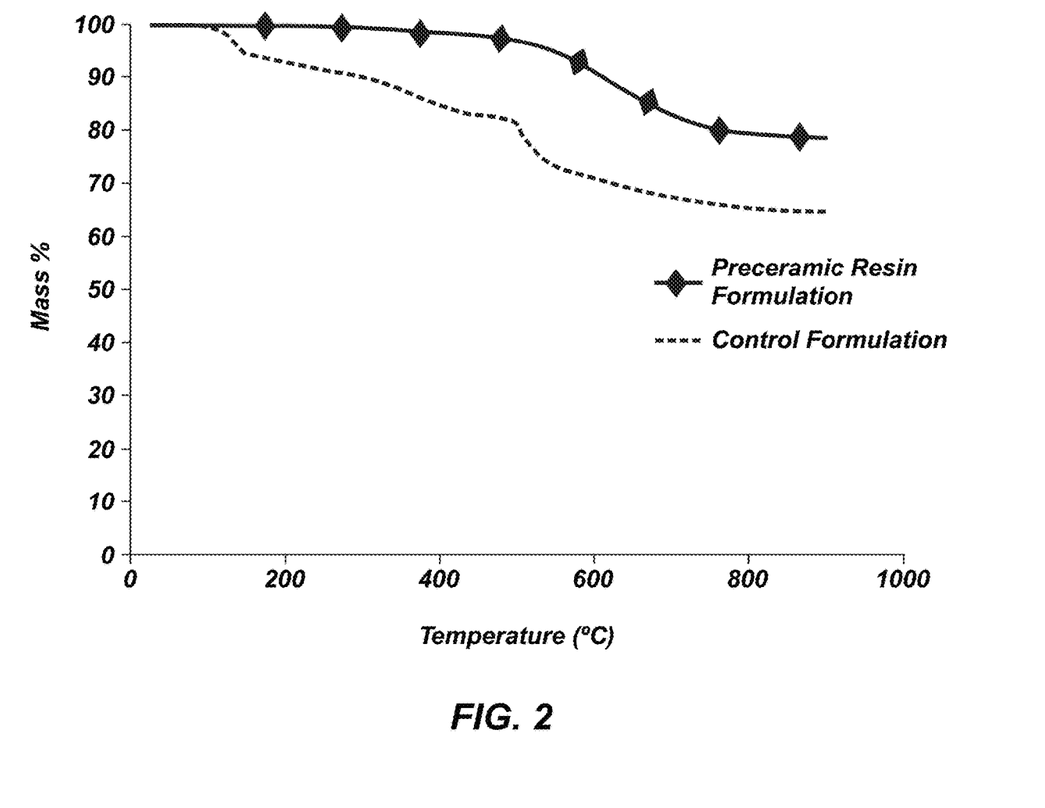
FIG. 2 is a thermogravimetric analysis (TGA) curve showing the mass percent as a function of temperature for the ceramic materials described in Example 1.

Thermogravimetric analysis (TGA) of the ceramic material formed from the preceramic resin formulation of Example 1 and the ceramified control formulation was conducted to determine the weight loss of the ceramic materials as a function of temperature. The TGA was conducted by conventional techniques. As shown in FIG. 2, the ceramic material formed from the preceramic resin formulation of Example 1 exhibited a 78.4% ceramic yield, while the ceramic material formed from the control formulation exhibited a 64.6% ceramic yield. Therefore, the ceramic material formed from the preceramic resin formulation of Example 1 had a 21.4% increase in mass retention compared to the ceramified control formulation including only the CSO-110. Thus, the ceramic yield of the ceramic material formed from the preceramic resin formulation of Example 1 was significantly increased compared to the ceramified control formulation.

Figure 3:
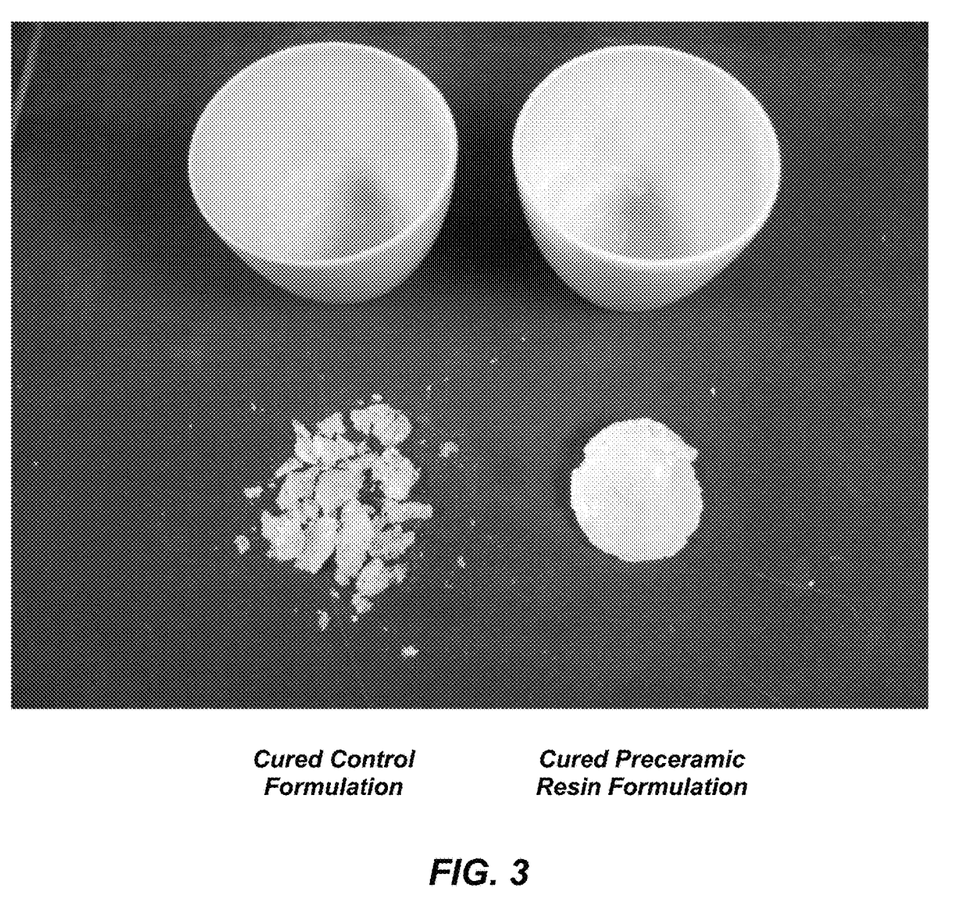
FIG. 3 is a photograph of the ceramic materials described in Example 1.

In addition to the increased ceramic yield, no cracking was observed with the cured preceramic resin formulation (cured at 250° F. for 4 hours) of Example 1, as shown in FIG. 3. The cured preceramic resin formulation formed from the polycarbosilane preceramic polymer and the organically modified silicon dioxide preceramic polymer exhibited net shape curing with no cracking. In contrast, the cured control formulation (cured at 250° F. for 4 hours) exhibited extensive cracking.

Example 3

Precursor Resin Formulations

Preceramic resin formulations including 100 parts of the polycarbosilane preceramic polymer CSO-110, 25 parts of the organically modified silicon dioxide preceramic polymer VQM-146, and 1 part of the platinum catalyst CLC-PL005 were prepared. The preceramic resin formulations also included titanium diboride and boron nitride (24:1 of titanium diboride:boron nitride, referred to herein as HTR42), zirconium dioxide and titanium diboride (2:1 zirconium dioxide:titanium diboride, referred to herein as HTR44), or titanium diboride, zirconium dioxide, and boron nitride (21:15:1 titanium diboride:zirconium dioxide:boron nitride, referred to herein as HTR45). The zirconium dioxide had an average mean diameter of 0.6 μm and was commercially available from Momentive Performance Materials Inc. (Waterford, N.Y.) as HCTF. The titanium diboride had an average mean diameter of 3 μm and was commercially available from Panadyne Inc. (Montgomeryville, Pa.) as PGZ-06. The zirconium dioxide and titanium diboride were present at 65 wt % with respect to the resin. The CSO-110, VQM-146, platinum catalyst, zirconium dioxide, and titanium diboride were combined with mixing.

Example 4

CMC Test Specimens-Shrinkage and Mass Loss

Test specimens were produced by impregnating Hex-Tow® IM7-R-12K fibers (PAN fibers) and YSH60A-A2S-12K graphite fibers (pitch fibers) with the preceramic resin formulations described in Example 3. The impregnated fibers were continuously wound on a mandrel, cured at 121° C. (250° F.) for four hours, subjected to a post-cure at 371° C. (700° F.) for two hours, and exposed to 1,093° C. (2,000° F.) for 30 minutes for the ceramic conversion to form ring-shaped test specimens. The curing and ceramification were conducted in an inert atmosphere (less than about 100 ppm oxygen). The density of the test specimen formed from HTR42 was 2.22 g/cm$^3$, the density of the test specimen formed from HTR44 was 2.19 g/cm$^3$, and the density of the test specimen formed from HTR45 was 2.07 g/cm$^3$.

Figure 4:
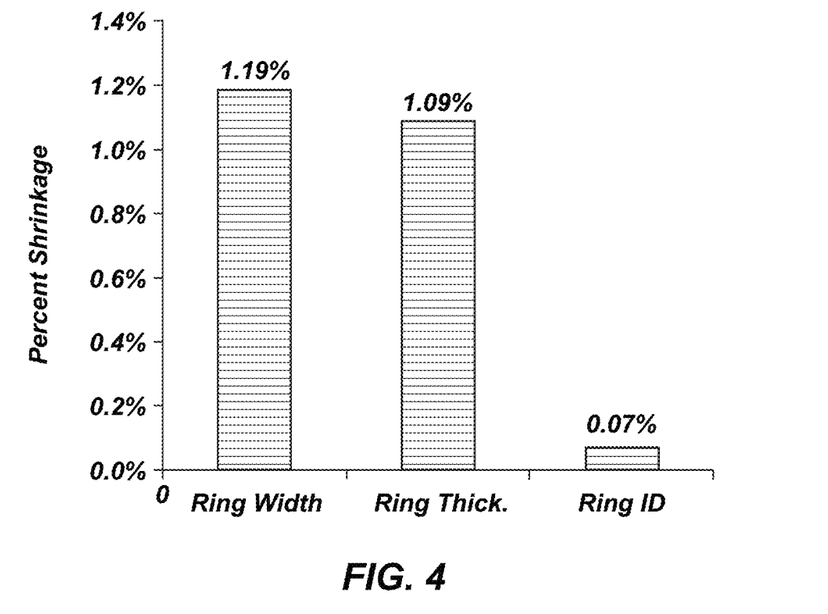
FIG. 4 is a plot showing percent shrinkage of test specimens described in Example 3 after a 700° F. post-cure heat treatment and after a 2,000° F. ceramic conversion.

Dimensions of the test specimen having HTR42 as the preceramic resin formulation were measured after the 371° C. (700° F.) post-cure and after the 1,093° C. (2,000° F.) ceramic conversion. The test specimen had low change in dimensions (ring width, ring thickness, ring inner diameter (ID), as shown in FIG. 4.

Figure 5:
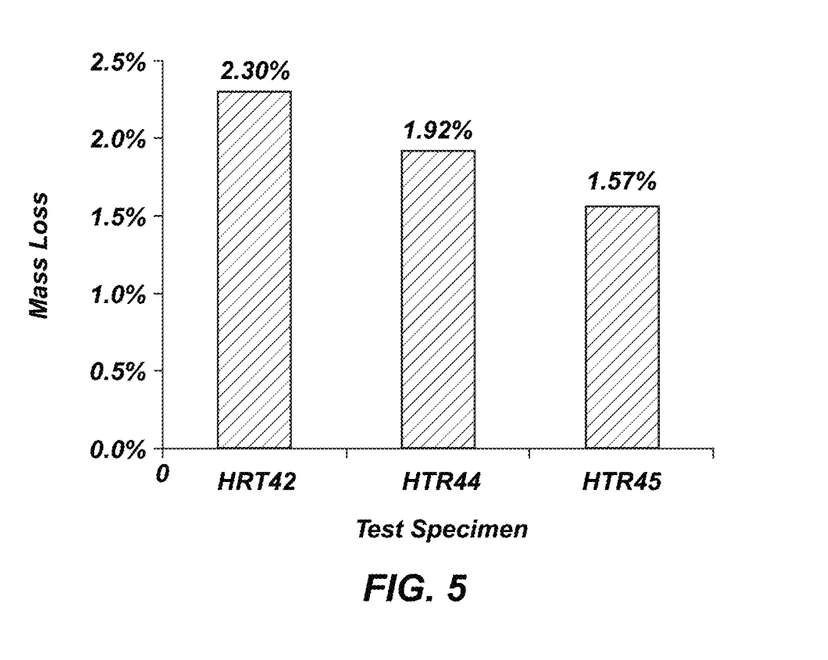
FIG. 5 is a is a plot showing mass loss of test specimens described in Example 3 after a 700° F. post-cure heat treatment and after a 2,000° F. ceramic conversion.

Mass loss of the test specimens having HTR42, HTR44, or HTR45 as the preceramic resin formulation were measured after 371° C. (700° F.) post-cure and after the 1,093° C. (2,000° F.) ceramic conversion. The test specimens had low mass loss, as shown in FIG. 5.

Example 5

Test Specimens-Mechanical Properties

Figure 6:
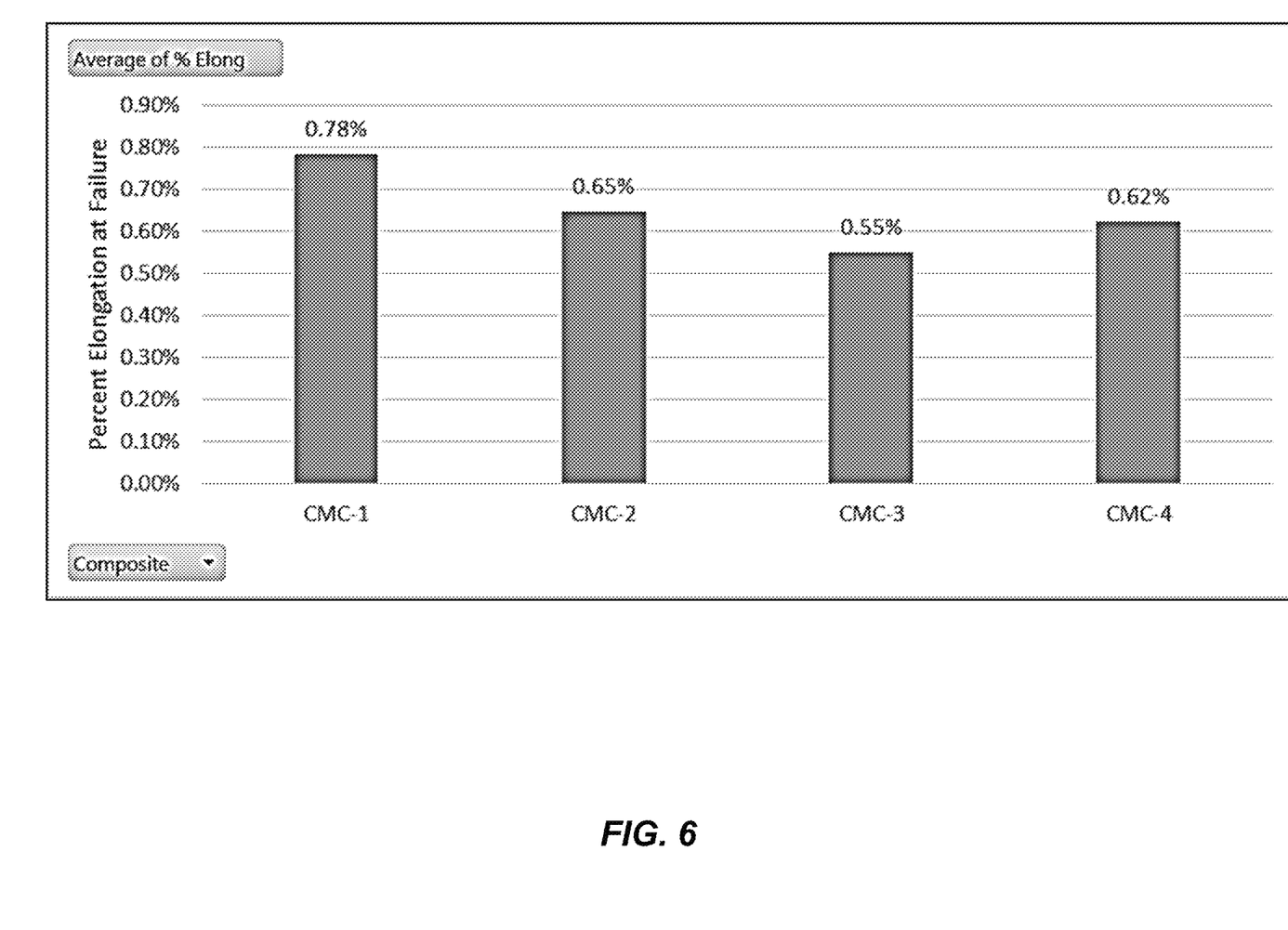
FIGS. 6 and 7 show mechanical properties of test specimens described in Example 5.
Figure 7:
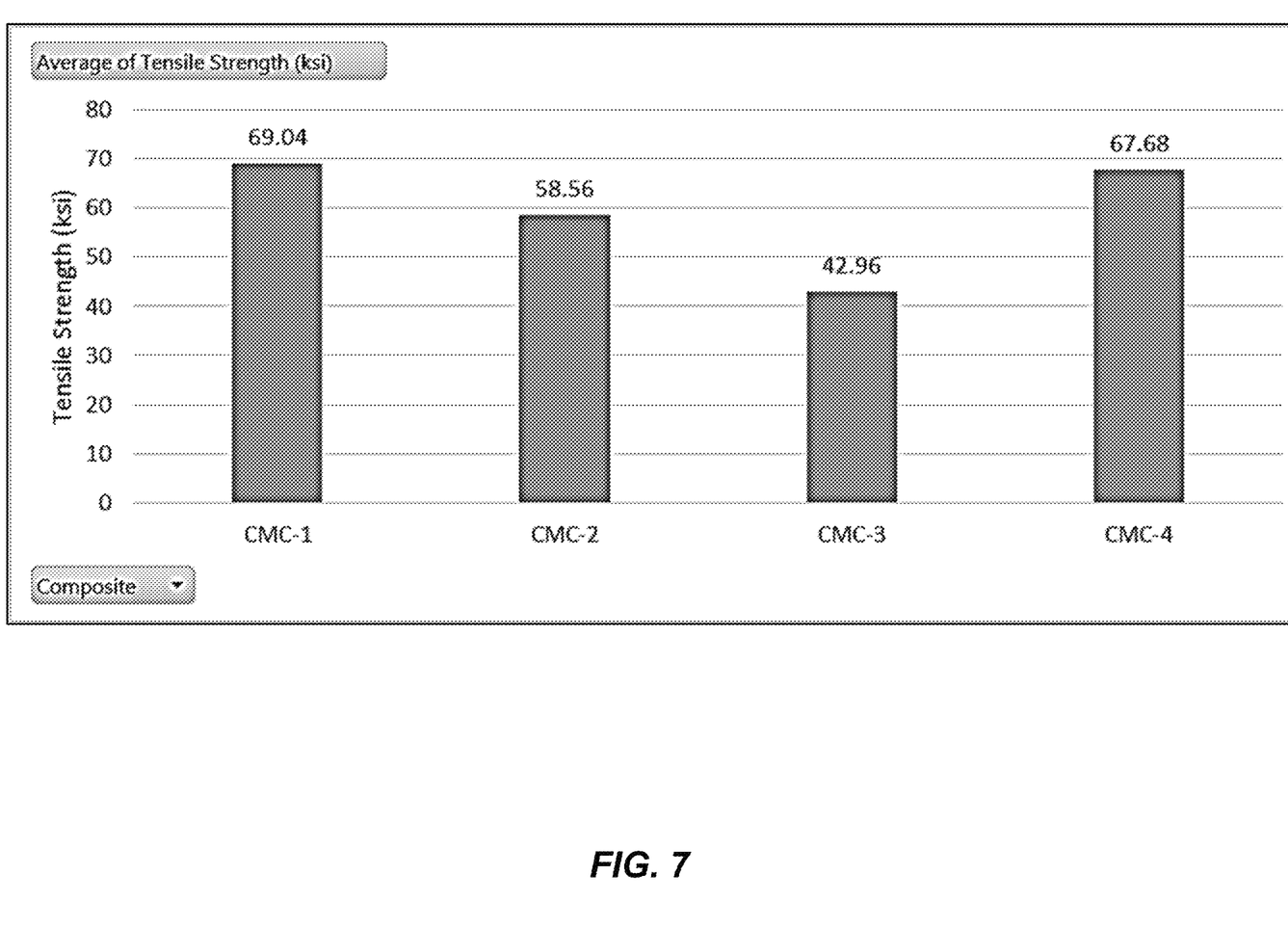

The preceramic resin formulation described in Example 3 as HTR42 was impregnated into HEXTOW® IM7-R-12K fibers (PAN fibers). The PAN fibers were coated with four different sizing compositions. The impregnated fibers were continuously wound on a mandrel, cured at 121° C. (250° F.) for four hours, and subjected to a post-cure at 204° C. (400° F.) for two hours to form ring-shaped test specimens. Tensile properties of the four test specimens were measured by conventional techniques. The test specimens are referred to as CMC-1, CMC-2, CMC-3, and CMC-4 and differ in the coating on the PAN fibers. As shown in FIGS. 6 and 7, the test specimens exhibited low percentages of elongation at failure and good tensile strength.

While the disclosure is susceptible to various modifications and alternative forms, specific embodiments have been shown by way of example in the drawings and have been described in detail herein. However, the disclosure is not intended to be limited to the particular forms disclosed. Rather, the disclosure encompasses all modifications, equivalents, and alternatives falling within the scope of the disclosure as defined by the following appended claims and their legal equivalents.

What is claimed is:

1. A method of forming a ceramic matrix composite, comprising:
    passing fibers through a preceramic resin formulation comprising an organically modified silicon dioxide preceramic polymer and at least one filler, the organically modified silicon dioxide preceramic polymer comprising quaternary coordinated oxygen to silicon atoms of the organically modified silicon dioxide preceramic polymer, and the preceramic resin formulation formulated to exhibit a viscosity of from about 200 cP at about 25° C. to about 5,000 cP at a temperature of about 25° C.;
    impregnating the fibers with the preceramic resin formulation; and
    forming the impregnated fibers into a composite material.

2. The method of claim 1, wherein passing fibers through a preceramic resin formulation comprises passing the fibers through a preceramic resin formulation formulated to exhibit a viscosity of from about 200 cP at about 25° C. to about 5,000 cP at a temperature of about 25° C.

3. The method of claim 1, wherein passing fibers through a preceramic resin formulation comprises forming continuous fibers impregnated with the preceramic resin formulation.

4. The method of claim 1, wherein passing fibers through a preceramic resin formulation comprises passing the fibers through a bath containing the preceramic resin formulation.

5. The method of claim 1, wherein passing fibers through a preceramic resin formulation comprises passing carbon fibers through the preceramic resin formulation.

6. The method of claim 1, wherein passing fibers through a preceramic resin formulation comprises passing the fibers through a preceramic resin formulation comprising the organically modified silicon dioxide preceramic polymer and at least one filler comprising first particles having an average mean diameter of less than about 1.0 µm and second particles having an average mean diameter of from about 1.5 µm to about 5 µm.

7. The method of claim 6, wherein passing fibers through a preceramic resin formulation comprises passing the fibers through the preceramic resin formulation comprising the organically modified silicon dioxide preceramic polymer and at least one of zirconium dioxide or titanium diboride.

8. The method of claim 6, wherein passing fibers through a preceramic resin formulation comprises passing the fibers through the preceramic resin formulation comprising the organically modified silicon dioxide preceramic polymer, zirconium dioxide, and titanium diboride.

9. The method of claim 1, wherein forming the impregnated fibers into a composite material comprises forming the composite material at a net shape.

10. The method of claim 1, wherein forming the impregnated fibers into a composite material comprises forming the composite material at a near-net shape.

11. The method of claim 1, wherein forming the impregnated fibers into a composite material comprises curing the impregnated fibers at a temperature of from about 121° C. to about 371° C. to form the composite material and ceramifying the composite material at a temperature of greater than about 816° C.

12. The method of claim 1, wherein curing the impregnated fibers comprises curing the impregnated fibers at a temperature of about 371° C. and ceramifying the composite material at a temperature of about 1,093° C.

13. The method of claim 1, wherein forming the impregnated fibers into a composite material comprises forming the composite material at a ceramic yield of greater than about 90%.

14. The method of claim 1, wherein forming the impregnated fibers into a composite material comprises forming the composite material at a mass loss of less than about 10%.

15. The method of claim 1, further comprising machining the composite material.

16. The method of claim 1, further comprising ceramifying the composite material to form a ceramic matrix composite.

17. The method of claim 16, wherein forming the impregnated fibers into a composite material comprises curing the impregnated fibers and ceramifying the composite material at a single heat treatment at a temperature of about 1,200° C.

18. The method of claim 1, wherein passing fibers through a preceramic resin formulation comprises passing the fibers through a preceramic resin formulation comprising the organically modified silicon dioxide preceramic polymer and a polycarbosilane preceramic polymer.

19. A preceramic resin formulation comprising an organically modified silicon dioxide preceramic polymer and at least one filler, the organically modified silicon dioxide preceramic polymer comprising quaternary coordinated oxygen to silicon atoms of the organically modified silicon dioxide preceramic polymer, and the preceramic resin formulation formulated to exhibit a viscosity of from about 200 cP at about 25° C. to about 5,000 cP at a temperature of about 25° C.

20. The preceramic resin formulation of claim 19, wherein the at least one filler comprises first particles having an average mean diameter of less than about 1.0 µm and second particles having an average mean diameter of from about 1.5 µm to about 5 µm.

21. The preceramic resin formulation of claim 19, wherein the at least one filler comprises silicon carbide, hafnium carbide, tantalum carbide, niobium carbide, zirconium carbide, tungsten carbide, molybdenum carbide, zirconium oxide, aluminum oxide, hafnium oxide, magnesium oxide, thorium oxide, boron nitride, hafnium nitride, tantalum nitride, zirconium nitride, titanium nitride, titanium diboride, hafnium diboride, tantalum diboride, zirconium diboride, tungsten boride, or combinations thereof.

22. The preceramic resin formulation of claim 19, wherein the at least one filler comprises at least one of zirconium dioxide or titanium diboride.

23. The preceramic resin formulation of claim 20, wherein the first particles of the at least one filler comprise the same material as the second particles of the at least one filler.

24. The preceramic resin formulation of claim 20, wherein the first particles of the at least one filler comprise a different material than the second particles of the at least one filler.

25. The preceramic resin formulation of claim 19, wherein the at least one filler comprises zirconium dioxide at an average mean diameter of from about 0.5 µm to about 0.6 µm and titanium diboride at an average mean diameter of from about 2 µm to about 5 µm.

26. The preceramic resin formulation of claim 19, wherein the at least one filler comprises zirconium dioxide at an average mean diameter of about 0.6 µm and titanium diboride at an average mean diameter of about 3 µm.

27. The preceramic resin formulation of claim 19, wherein the preceramic resin formulation does not comprise a surfactant.

28. The preceramic resin formulation of claim 19, further comprising boron nitride.

29. The preceramic resin formulation of claim 19, wherein the preceramic resin formulation further comprises a polycarbosilane preceramic polymer.

30. The preceramic resin formulation of claim 29, wherein the polycarbosilane preceramic polymer comprises monomers having a chemical structure of where $R_1$ and $R_2$ of each monomer is independently a hydrogen (H) group, a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000.

31. The preceramic resin formulation of claim 19, wherein the organically modified silicon dioxide preceramic polymer comprises monomers having a chemical structure of where each of $R_3$ and $R_4$ is independently a methyl ($CH_3$) group, a vinyl group ($CH_2$=CH) directly bonded to the silicon atom, or a vinyl group ($CH_2$=CH) bonded to the silicon atom by an alkyl linker, and n is an integer from 2 to 10,000.

32. The preceramic resin formulation of claim 29, wherein the preceramic resin formulation comprises the polycarbosilane preceramic polymer, the organically modified silicon dioxide preceramic polymer, zirconium dioxide, and titanium diboride.

33. The preceramic resin formulation of claim 19, wherein the preceramic resin formulation comprises the organically modified silicon dioxide preceramic polymer and a preceramic precursor of a material selected from the group consisting of silicon carbide, silicon nitride, silicon hexaboride, aluminum nitride, boron nitride, boron carbide, titanium boride, titanium carbide, and hafnium carbide.

34. The preceramic resin formulation of claim 19, wherein the preceramic resin formulation comprises the organically modified silicon dioxide preceramic polymer, a polycarbosilane preceramic polymer, and at least one of a crosslinking agent, a polycarbosilane, a polysiloxane, boron nitride, or a filler.

35. Impregnated fibers comprising fibers and a preceramic resin formulation comprising an organically modified silicon dioxide preceramic polymer and at least one filler, the organically modified silicon dioxide preceramic polymer comprising quaternary coordinated oxygen to silicon atoms of the organically modified silicon dioxide preceramic polymer, the preceramic resin formulation formulated to exhibit a viscosity of from about 200 cP at about 25° C. to about 5,000 cP at a temperature of about 25° C., and the at least one filler comprising first particles having an average mean diameter of less than about 1.0 and second particles having an average mean diameter of from about 1.5 µm to about 5 µm.

36. The impregnated fibers of claim 35, wherein the fibers comprise polyacrylonitrile-based fibers.

37. The impregnated fibers of claim 35, wherein the fibers comprise pitch-based fibers.

38. The impregnated fibers of claim 35, wherein the preceramic resin formulation further comprises a polycarbosilane preceramic polymer.

39. The impregnated fibers of claim 35, wherein the fibers comprise carbon fibers, ceramic fibers, glass fibers, aramid fibers, polyethylene fibers, or combinations thereof.

40. The impregnated fibers of claim 35, wherein the fibers comprise coated carbon fibers or carbon fibers with a surface converted to silicon carbide.

41. The impregnated fibers of claim 40, wherein the coated carbon fibers comprise a boron nitride coating or a boron nitride/silicon carbide coating.

42. A preceramic resin formulation comprising an organically modified silicon dioxide preceramic polymer and at least one filler, the organically modified silicon dioxide preceramic polymer comprising quaternary coordinated oxygen to silicon atoms of the organically modified silicon dioxide preceramic polymer.

* * * * *

UNITED STATES PATENT AND TRADEMARK OFFICE
CERTIFICATE OF CORRECTION

PATENT NO. : 10,875,813 B2                                          Page 1 of 1
APPLICATION NO. : 15/819658
DATED : December 29, 2020
INVENTOR(S) : Benjamin W. C. Garcia and David R. Nelson It is certified that error appears in the above-identified patent and that said Letters Patent is hereby corrected as shown below:

In the Claims

Claim 35,   Column 22,   Line 34,   change "1.0 and" to --1.0 µm and--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*